PRIOR ART  Fig-1
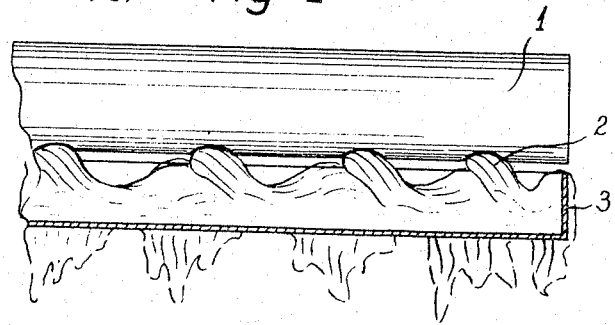
PRIOR ART  Fig-2
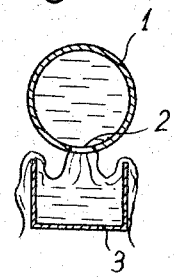
Fig. 3
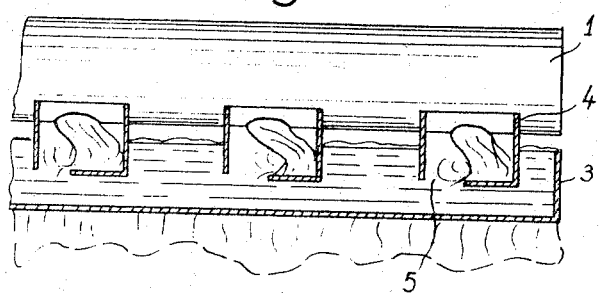
Fig. 4
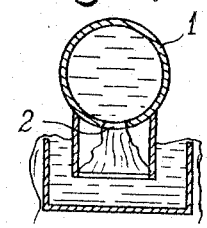
Fig. 5
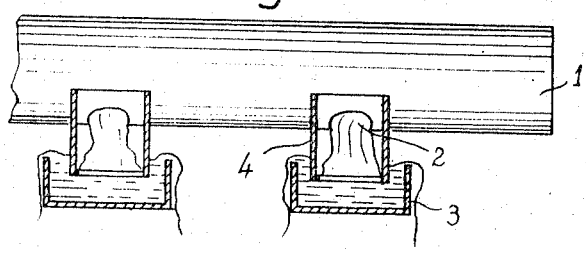
Fig. 6
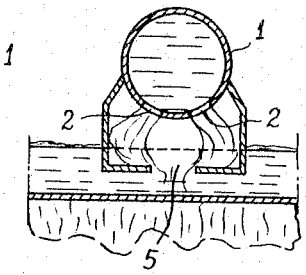
Inventor
JOSEPH ANDRÉ JACIR
By Stevens, Davis, Miller & Mosher
Attorneys

United States Patent Office 3,315,896
Patented Apr. 25, 1967

3,315,896
LIQUID-COOLING APPARATUS
Joseph André Jacir, 13 Rue Jean Bachelet,
Neuilly-Plaisance, France
Filed Mar. 10, 1965, Ser. No. 438,487
Claims priority, application France, Mar. 11, 1964,
967,024, Patent 1,396,478
3 Claims. (Cl. 239—193)

Many known types of apparatus exist for ensuring intimate contact between two respectively liquid and gaseous fluids, an example being water-cooling apparatus in which the water flows under gravity through a stream of air.

In such an apparatus it is indispensable that distribution of the fluids be effected as correctly as possible immediately upon entry into the apparatus, in order to ensure optimum heat transfer efficiency.

It is customary for the liquid fluid to be delivered to the top of the apparatus, from a feed tank or a feed pipe. From this tank or pipe are led pipes filled with holes through which the liquid spills into basins which, in overflowing, distribute the fluid longitudinally, the transverse distribution thereof being ensured by a distributing device positioned beneath the basin.

In order to provide a good distribution of the liquid fluid through the holes in the pipes it is necessary for the pressure therein to be relatively high. This in turn results in a turbulent flow into the basin, with ensuing troughs and consequently very unequal overflowing along the basin and breaks in the continuity of the flow. This results in poor distribution.

It is the object of the present invention to provide a device for destroying the residual pressure on exit from the pipe holes, whereby the overflow process may be rendered homogeneous and the flow thereby made perfectly regular over the entire length of the basin.

The present invention accordingly provides for an expansion chamber at each pipe outlet orifice, wherein the fluid loses its residual pressure and wherefrom it issues at sufficiently low speed to ensure a homogeneous flow with total elimination of the eddies.

The invention will now be more particularly described with reference to the accompanying non-limitative exemplary drawing, in which:

FIGURES 1 and 2 show in longitudinal and cross-section respectively a conventional device which results in the formation of eddies, waves and troughs and a consequent disorderly distribution of the flow into and overflow from the basin;

FIGURES 3 and 4 show in longitudinal and cross-section respectively a device according to the invention, in which the flow is effected into a basin placed parallel with the pipe; and FIGURES 5 and 6 show a further device according to the invention, in which the flow is effected into basins placed perpendicularly to the pipes.

In water-cooling devices used heretofore the water is led to the top of the apparatus through a series of parallel horizontal pipes such as that designated by reference numeral 1, whence it escapes through holes 2 and falls into basins 3 from which it subsequently overflows to be distributed longitudinally (see FIGURES 1 and 2).

It will be noted, however, that the water escaping from the holes under a certain pressure produces a swirling effect in the basin, resulting in the formation of troughs which interrupt the overflow here and there.

With a view to overcoming this drawback, the present invention provides for diverter boxes 4 at each hole outlet, these boxes being welded or otherwise secured to the pipes 1 and dipping into the basins below overflow level. The bottom of each box is open as at 5 to enable the water to flow therethrough into the basin.

When the basins 3 are positioned parallel to the pipes, each one thereof is located immediately beneath a pipe, the holes 2 are formed along the axis of the basin, and the bottoms of the boxes 4 embody passageways 5 preferably formed in the upstream portion of the box (see FIGURES 3 and 4).

When the basins are arranged transversely to the pipes, the latter are drilled on opposite sides of the vertical axial plane and the boxes 4 then embody passageways 5 lying in the pipe axis.

What is claimed is:

1. In a water-cooling apparatus having apertured pipes through which water is conveyed, and troughs located adjacent the pipes for receiving water from the pipes through said apertures for distribution by an overflow process, the improvement comprising diverter boxes disposed beneath the pipes surrounding the holes, said boxes having walls extending into said troughs below the overflow level and having openings to enable the water to flow into the troughs.

2. The improvement of claim 1, wherein said openings are located in the bottom corners of said boxes.

3. The improvement of claim 1, wherein said troughs are located transverse to the direction of water flow in said pipes.

References Cited by the Examiner
FOREIGN PATENTS
193,116    2/1923    Great Britain.

EVERETT W. KIRBY, Primary Examiner.